United States Patent [19]

Yamada et al.

[11] Patent Number: 4,841,323
[45] Date of Patent: Jun. 20, 1989

[54] AUTOMATIC FOCUSING METHOD AND CAMERA PROVIDED WITH AUTOMATIC FOCUSING APPARATUS

[75] Inventors: Minoru Yamada; Eiji Ito; Kenji Miyama, all of Hachioji; Masataka Sawamura, Hino; Yasushi Hoshino, Tokyo; Masamori Makino, Hino, all of Japan

[73] Assignee: Konishiroku Photo Industry Co., Ltd., Tokyo, Japan

[21] Appl. No.: 169,102

[22] Filed: Mar. 9, 1988

Related U.S. Application Data

[63] Continuation of Ser. No. 890,181, filed as PCT JP85/00666 on Dec. 4, 1985, published as WO86/03600 on Jan. 19, 1986.

[30] Foreign Application Priority Data

| Dec. 4, 1984 | [JP] | Japan | 59-184450[U] |
| Dec. 4, 1984 | [JP] | Japan | 59-256870 |
| Dec. 4, 1984 | [JP] | Japan | 59-256872 |
| Dec. 5, 1984 | [JP] | Japan | 59-258114 |
| Apr. 23, 1985 | [JP] | Japan | 60-88322 |
| Apr. 30, 1985 | [JP] | Japan | 60-93394 |

[51] Int. Cl.$^4$ .............................. G03B 3/00
[52] U.S. Cl. .............................. 354/400; 354/195.1
[58] Field of Search .............................. 354/400–408, 354/195.1, 195.11, 195.12, 195.13, 229, 234.1

[56] References Cited

U.S. PATENT DOCUMENTS

| 4,182,555 | 1/1980 | Imura et al. | 354/195.13 |
| 4,274,720 | 6/1981 | Tsujimoto | 354/402 |
| 4,426,145 | 1/1984 | Hashimoto | 354/234.1 |
| 4,504,132 | 3/1985 | Martin et al. | 354/195.1 |
| 4,519,691 | 5/1985 | Yamada et al. | 354/195.1 |
| 4,540,264 | 9/1985 | Daitoku et al. | 354/400 |
| 4,576,460 | 3/1986 | Daitoku et al. | 354/195.1 |
| 4,598,989 | 7/1986 | Yamada et al. | 354/195.1 |
| 4,623,233 | 11/1986 | Yamada et al. | 354/229 |
| 4,634,221 | 1/1987 | Hopfner | 354/234.1 |
| 4,696,559 | 9/1987 | Kondo | 354/234.1 |
| 4,733,261 | 3/1988 | Gunshi et al. | 354/400 |

FOREIGN PATENT DOCUMENTS

| 0121326 | 10/1976 | Japan . | |
| 0260927 | 12/1985 | Japan | 354/400 |
| 1270597 | 4/1972 | United Kingdom . | |
| 2161947 | 1/1986 | United Kingdom | 354/400 |

Primary Examiner—Russell E. Adams
Attorney, Agent, or Firm—Jordan B. Bierman

[57] ABSTRACT

A camera provided with an automatic focusing apparatus having a lens-driving device (40) to move a photographing lens (50) in the direction of an optical axis to a focal position on the basis of a distance information from a distance-measuring device, a lens-positioning device (30) to determine a position of stoppage of the photographing lens (50) moved in the direction of the optical axis, and one motor (60) driving the two devices (40) and (30).

An automatic focusing method of detecting a distance to an object by a distance-measuring device, moving the photographing lens (50) in the direction of an optical axis on the basis of the information on the distance, determining a position of stoppage of the photographing lens (50) at the same time substantially, and stopping the photographing lens (50) at this position.

10 Claims, 6 Drawing Sheets

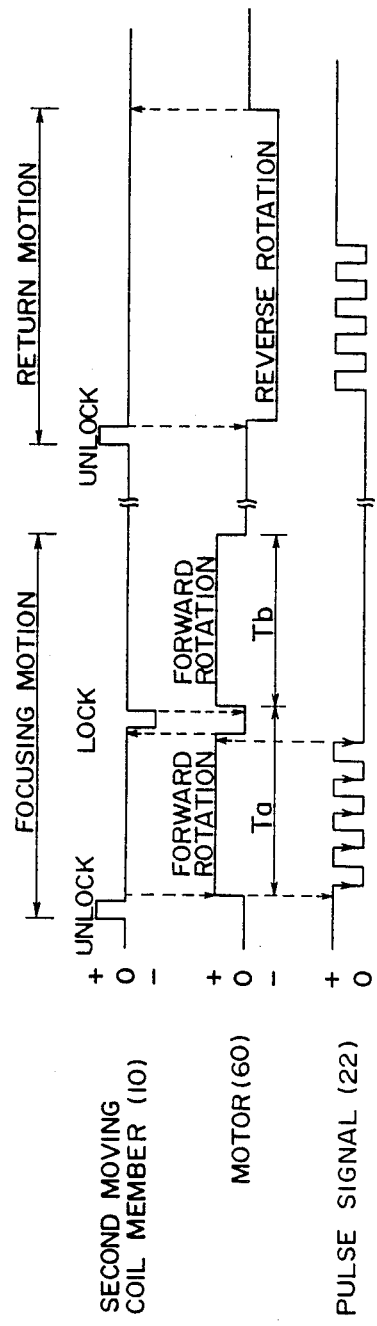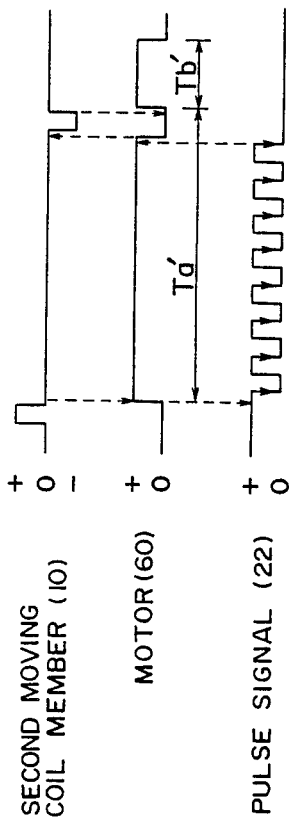

AUTOMATIC FOCUSING METHOD AND CAMERA PROVIDED WITH AUTOMATIC FOCUSING APPARATUS

This application is a continuation of application Ser. No. 890,181 filed July 14, 1986.

1. Technical Field

The present invention relates to an automatic focusing method for a camera in which a photographing lens is operated to a focal position in accordance with a measured-distance signal, and to a camera which is provided with an automatic focusing apparatus.

2. Background Art

As a means to focus automatically a photographing lens in a camera, a method has been taken in recent years, in which the so-called stepped-cam member having a portion stepped vertically in the direction of an optical axis and formed on an end surface of a cylinder is rotated around the optical axis and the photographing lens is displaced in the direction of the optical axis by said stepped portion.

As the simplest structure according to this method, an example is known in which the aforesaid stepped portion is formed to be a continuous cam surface and the photographing lens is urged against the cam surface by a spring member so that it can move forward and backward in the direction of the optical axis.

In this structure, however, the photographing lens must be moved against the actuation of said spring member when it is moved back to its initial position, and therefore a large output is demanded from a motor or an electromagnetic device, either of which is a power source therefor. Moreover, the cam surface is inferior in precision since it is formed in a curved surface, and further the cam member is liable to be worn out due to friction, which is said to cause a problem of durability.

There is another designed structure in which a lens-driving member having a cam groove for moving the photographing lens in the direction of the optical axis is provided separately from the stepped-cam member and it is operated to push the photographing lens against the stepped-cam member after this member is beforehand rotated to and stopped at a position to which the photographing lens is to be moved, that is, a structure in which the stepped-cam member is employed only as a lens-positioning member.

According to this structure, the spring member actuating the photographing lens in the direction of the optical axis is unnecessary, and thereby a load on a power source is lessened. In addition, high precision is secured since a stepped cam can be employed, and also excellent durability can be obtained since this structure is not accompanied by the slide friction caused by a large load. However, said structure has a negative aspect that an automatic focusing operation requires a long time since the operation of the lens-positioning member for setting the position of the photographing lens and the operation of the lens-driving member for urging the photographing lens to its set position are conducted in series.

Furthermore, in a construction in which the stepped cam is employed as an automatic focusing device as described above, a focal position of the photographing lens on the optical axis is at a short distance from a reference position when an object is near, while it is at a long distance from the reference position when the object is remote. Consequently the amount of movement of the photographing lens differs according to the distance to the object, in other words, the result of measurement of the distance, which results in a difference in a time required for the automatic focusing operation. Therefore, there is a possibility that an unintentional movement of the hands occurs when a long time is required this operation.

To cope with these problems, a focusing apparatus in which the functions of the stepped-cam member and the lens-driving member are separated from each other and a driving power is distributed for each of them so that the apparatus can be operated by a small driving power source can be devised, by adopting a structure which is provided with a so-called stepped-cam member having a portion stepped vertically in the direction of the optical axis and formed on an end surface of a cylinder and, aside therefrom, a lens-driving member making the photographing lens move in the direction of the optical axis and making it contact with the stepped portion of the stepped-cam member, and in which the operation for focusing the photographing lens is executed by the cooperation of these members.

The functions of said members are fulfilled in the following way: first a step element is selected with the rotation of the stepped-cam member around the optical axis by a power applied according to a measured-distance signal, and then the driving member is rotated so that a spiral cam groove formed on the peripheral surface thereof moves a pin of a frame of the photographing lens which is made capable of advancing straight only in the direction of the optical axis, so as to make the pin contact with the aforesaid step element and thereby to set the photographing lens at a focal position.

The pin of the frame of the photographing lens is designed to be restrained and supported both by a groove for straight movement in the direction of the optical axis provided in a fixed part of a lens-barrel and by the aforesaid spiral cam groove, and when the lens-driving member is rotated, the pin is made to contact slidably with a slanting surface of the spiral cam groove and is moved in the direction of the optical axis by a component force of said slanting surface.

On the occasion when the pin of the frame of the photographing lens is made to contact with the stepped cam having stopped already, by said component force of the slanting surface of the rotating spiral cam groove, as described above, there is a tendency that a large frictional force is generated by a wedging action because of a relatively small slanting angle of the cam groove and other causes and thereby the slanting surface of the cam groove is pressed strongly against the pin of the frame of the photographing lens.

Therefore a large rotational power is needed for rotating the lens-driving member reversely to back the photographing lens to an initial position, which results in a fault that the reverse rotation turns impossible when a power therefor is derived from a motor.

An photographing optical system of a bifocal camera in which a focal distance can be switched over to two stages of long and short by a common optical system comprises a main lens for photographing and a conversion lens in general, and it is so constructed that a long focal distance can be obtained by combining these lenses and a short focal distance can be obtained by employing said main lens alone while the conversion lens is disengaged.

An operation for switching in this photographing optical system is usually conducted in such a manner that a lens-barrel called as a movable lens unit in which both the main lens for photographing and the conversion lens described above are held is pulled out of or sunk into the main body of a camera.

In the case when an automatic focusing apparatus is incorporated in such a bifocal camera, members for moving the aforesaid photographing main lens to a focal position and controlling same are to be incorporated in the above-stated movable lens unit. In this case, however, the structure of the camera turns complicated, since a motor, a power source for driving each of these members, is often disposed in the main body of the camera, involving such requirement as to make a power transmission mechanism function following after the movement of said main lens. In addition, the lowering of an operation efficiency is inevitable, since a transmission distance becomes long.

DISCLOSURE OF INVENTION

An object of the present invention is to minimize a time required for focusing and also to lessen a load on a power in an automatic system for focusing a photographing lens which is provided separately with a member for driving the lens and a member for positioning the lens, thus making it possible to obtain an accurate shutter timing on photographing.

The above-stated object of the present invention is attained by an automatic focusing apparatus characterized in that a cam groove of a lens-driving member with which a guide pin of a photographing lens moving straight in the direction of an optical axis is engaged slidably is provided in a position being parallel to a stepped cam of a lens-positioning member and spaced slightly therefrom in the direction of the optical axis, while the starting portion of said cam groove is extended in the circumferential direction so as to hold the aforesaid guide pin at its end to prevent the photographing lens from moving in the direction of the optical axis at the initial stage of rotation of the aforesaid lens-driving member. That is, in the above-stated construction, as the lens-driving cam groove for moving the lens in the direction of the optical axis and the stepped cam for positioning the lens are formed substantially parallel to each other in the lens-driving member and the lens-positioning member respectively, said lens-driving member and said lens-positioning member are moved so that the aforesaid lens-positioning stepped cam can precede the aforesaid lens-driving groove cam, and the lens-positioning member is stopped according to a measured-distance signal so as to set a lens position.

Another object of the present invention is to furnish a camera in which a time of operation required until the photographing lens is put in focus is constant substantially irrespective of the result of measurement of a distance and thus the time required is shortened.

The above-stated object can be attained by a camera which is provided with a stepped cam having a plurality of steps formed corresponding to a plurality of focal positions, a selection mechanism selecting a step of said stepped cam according to the result of measurement of a distance, and a pressing mechanism pressing the photographing lens against the aforesaid selected step of the stepped cam, and in which a time of pressing by said pressing mechanism is set to be short when a time required for a selecting operation of said selection mechanism is long and to be long when this time is short.

A third object of the present invention is to minimize a time required for focusing so as to make it possible to obtain an accurate shutter timing on photographing in a method in which a means to drive the lens and a means to position it are operated separately from each other to set the photographing lens at its focusing position.

The above-stated object of the present invention is attained by a method for focusing and an apparatus therefor which are characterized in that a cam groove of the lens-driving member with which the guide pin of the photographing lens moving straight in the direction of the optical axis is engaged slidably is provided in a position being parallel to the stepped cam of the lens-positioning member and spaced slightly therefrom, the two members are operated together so that the rotation of the stepped cam and the movement of the photographing lens are conducted simultaneously, and after said lens-positioning member is stopped according to a signal of a control unit, said lens-driving member alone is operated to urge the pin of the photographing lens immediately against the stepped cam for focusing. That is, in the above-stated construction, the lens-driving member and the lens-positioning member are started at the same time substantially, and after the lens-positioning member is stopped, the lens-driving member is stopped at a position set by said lens-positioning member.

A fourth object of the present invention is to minimize a time required for focusing so as to obtain an accurate shutter timing on photographing, in the automatic focusing apparatus of the photographing lens which is provided with a member for driving the lens and a member for positioning the lens separately from each other.

The above-stated object of the present invention is attained by an automatic focusing apparatus characterized in that a lens-driving member and a lens-positioning member engaged integrally with each other are started simultaneously by a motor, an electromagnetic device is started to cancel the engagement of the lens-positioning member with the lens-driving member when the former rotates through an angle corresponding to a distance information stored in a control unit, and after said lens-positioning member is stopped, said lens-driving member rotates a little continuously to set the photographing lens to a focal position. That is, in the automatic focusing system in which the lens is set at a position corresponding to a measured-distance signal by an operating process of the lens-positioning member through stages of disengagement - movement - engagement, a bistable electromagnetic device is employed as a means to execute disengagement and engagement.

A fifth object of the present invention is to furnish a focusing apparatus of a camera which makes it possible to ensure the return of the photographing lens to its initial position even with a small power of a motor as the results of the above-stated settlement and improvement.

The above-stated object is attained by a focusing apparatus of a camera characterized in that, in a focusing system in which the lens is moved in the forward direction, made to contact with a stop member and stopped thereat and then is moved in the backward direction to be returned to an initial position, a signal to make said lens move in the forward direction is given to a motor temporarily prior to a signal given thereto for making the lens move in the backward direction.

A sixth object of the present invention is to enable the disposition inside a movable lens unit of a motor which is a power source for a focusing operation in a bifocal camera, thus simplifying a power transmission mechanism and making it efficient.

The above-stated object of the present invention is attained by a bifocal camera characterized in that the aforesaid motor is held in the remainder of a sectional space occupied by a conversion lens unit inside a lens-barrel of the movable lens unit so that said motor is disposed at a certain close distance to a main lens for photographing, thus the lens-driving motor being disposed by utilizing a gap which is formed by the disposition of a rear lens unit outside a photographing optical path in the rear of a front lens unit in a bifocal camera in which a bifocal optical system is formed with said rear lens unit designed to move into and out of the optical path.

BRIEF DESCRIPTION OF DRAWINGS

FIGS. 3 and 4 are time charts showing the operation of the aforesaid apparatus.

BEST MODE FOR CARRYING OUT THE INVENTION

Figure 1:
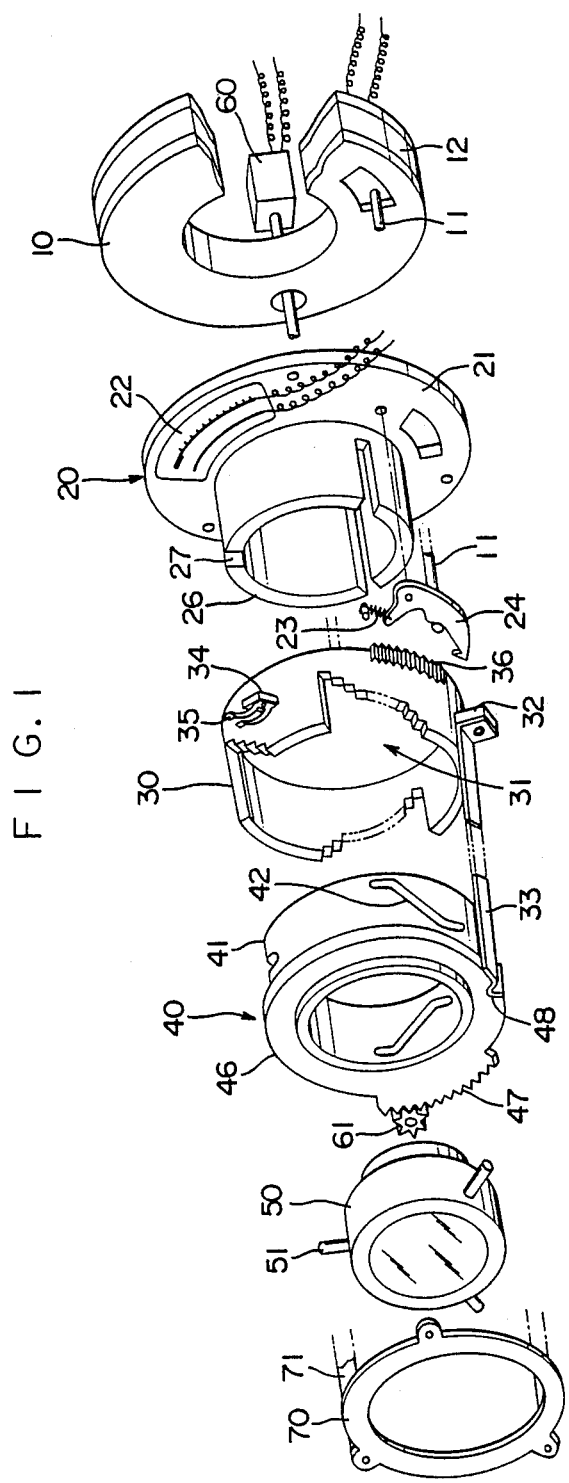
FIG. 1 is a perspective view of an automatic focusing system of the present invention.
Figure 2A:
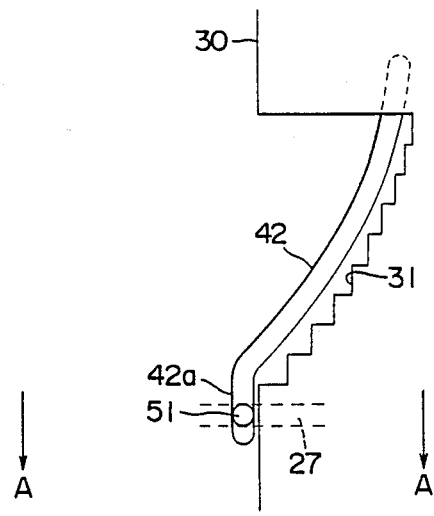
FIGS. 2 (a) and 2 (b) are plan views of the principal part thereof respectively.
Figure 2B:
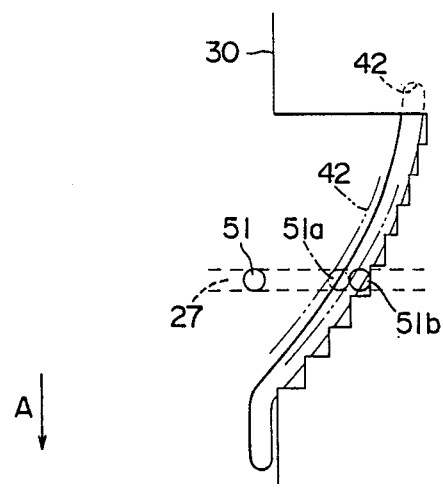

One embodiment of the automatic focusing apparatus of the present invention is shown in FIG. 1, FIGS. 2 (a) and 2 (b) and FIG. 3.

FIG. 1 shows members forming the present apparatus, which are developed in the direction of an optical axis. Each of these members is incorporated as a unit in a lens-barrel of a camera and is driven and controlled by a power source and a control unit which are provided on the side of the main body of the camera.

Numeral 10 denotes an electromagnetic unit fixed inside the lens-barrel, inside of which a first movable coil member (not shown in the figure) controlling the amount of exposure of a photographing lens and a second movable coil member 12 having a regulation pin 11 planted thereon for regulating an engagement member to be described later are so held that they can be rotated around an optical axis.

Numeral 20 denotes a lens guide fitted on the front of the aforesaid electromagnetic unit. This lens guide 20 is constituted by a flange part 21, a cylindrical part 26, a printed plate 22 having a detecting pattern for sending informations on a lens position to the aforesaid control unit and a stop pawl 24 fitted axially and actuated in the clockwise direction by a helical extension spring 23, provided on the flange part 21. Said stop pawl 24 is prevented from rotating in the clockwise direction by an engaging action of the aforesaid regulation pin 11 of the electromagnetic unit 10 which pierces through the flange part 21.

In the periphery of the aforesaid cylindrical part 26, on the other hand, three straight movement grooves 27 are provided a equal intervals and in the direction of the optical axis, and guide pins 51 of a photographing lens 50 fitted slidably on the inner periphery of said part are fitted in these grooves respectively so that said photographing lens 50 is held in such a manner that it can move forward and backward in the direction of the optical axis.

Numeral 40 denotes a lens-driving member put rotatably on the outer periphery of the cylindrical part 26 of the aforesaid lens guide 20, and three cam grooves 42 which are provided in the cylindrical part 41 of the member and through which the aforesaid guide pins 51 of the photographing lens 50 are put respectively form the condition for regulating a straight movement position of the photographing lens 50 in co-operation with the aforesaid straight movement grooves 27. In addition, the aforesaid lens-driving member 40 is so designed that it can be rotated clockwise from the position shown in the figure and also rotated reversely for returning thereto by a pinion 61 of a motor 60 through the intermediary of a gear portion 47 provided on the flange part 46 of the member.

Numeral 30 denotes a lens-positioning member put on the cylindrical part 41 of the aforesaid lens-driving member 40, and on the end surface thereof, stepped cams 31 with which the guide pins 51 of the photographing lens 50 are made to contact respectively so as to set the lens 50 at a prescribed focusing position are provided in three positions corresponding to said guide pins 51 respectively. The fore end of a presser spring 33 fitted to a projection 32 of the lens-positioning member 30 is designed to engage with a V-shaped cut 48 provided in the flange part 46 of the lens-driving member 40, and thereby the lens-positioning member 30 and the lens-driving member 40 are made integral with each other to be rotated together simultaneously by the aforesaid motor 60.

A design is made so that the cam groove 42 of said lens-driving member 40 is disposed substantially parallel to the stepped cam 31 of said lens-positioning member 30 and provided slightly apart therefrom at a position at which the guide pin 51 of the photographing lens 50 regulated by the groove cam 42 is prevented from contacting with the stepped cam 31 in the above-described state of simultaneous rotation of the two members.

The other projection 34 of the lens-positioning member 30 is fitted with a contact piece 35, which slides on an intermittent circuit pattern formed on the printed plate 22 of the aforesaid lens guide 20 as the lens-driving member 40 rotates, thus sending a pulse signal to the aforesaid control unit. Moreover, in another part of the member 30 pawl teeth 36 are so formed as to engage with the aforesaid stop pawl 24 which is operated by a signal from said control unit.

Figure 5:
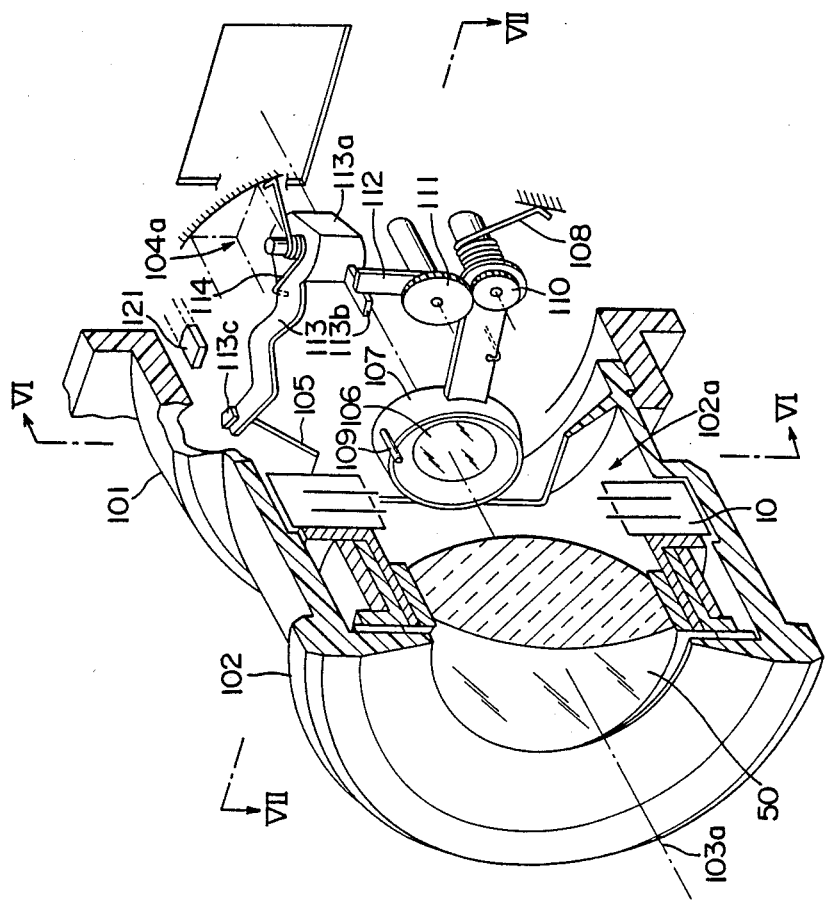
FIG. 5 is a perspective view of a movable lens unit in a bifocal camera of the present invention.
Figure 6:
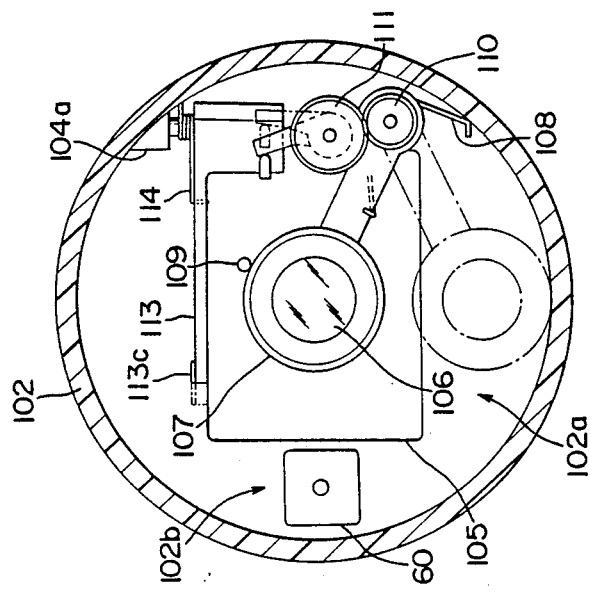
FIG. 6 shows a section taken along a line VI—VI of FIG. 5.
Figure 7:
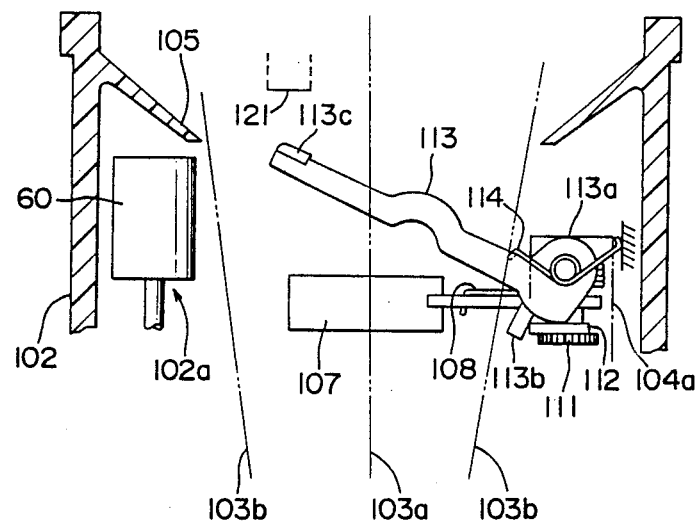
FIG. 7 shows a section taken along a line VII—VII of FIG. 5.

The lens-driving member 40 and the lens-positioning member 30 thus constructed are held between the front surface of the flange part 21 of the lens guide 20 and the back surface of a presser plate 70 fitted to said flange part 21 through the intermediary of three pillars 71, and are supported thereby rotatably. Next, one embodiment of a movable lens unit in a bifocal camera of the present invention is shown in FIGS. 5 to 7.

Numeral 101 denotes the base part of a lens-barrel fixed to the front of the main body (not shown in the figure) of the camera, and 102 a movable lens unit which is fitted slidably forward and backward in said base part 101 of the lens-barrel so that it can be pulled out of and, reversely, sunk into said part as shown in the figure.

A photographing main lens 50 forms a front lens unit of a photographing optical system, together with the electromagnetic unit 10 and a focusing device disposed in front of it, and it is subjected to controls of exposure and focusing by the control unit provided in the main body of the camera.

Numeral 105 denotes a light-intercepting frame restricting the optical path of said photographing main lens 50, and 106 a conversion lens disposed between said electromagnetic unit 10 and said light-intercepting frame 105. The optical axis of this lens is so set as to coincide with an extension of the optical axis 103a of the photographing main lens 50.

Numeral 107 denotes a supporting member which supports said conversion lens 106 and is fitted axially to a fitting base plate (not shown in the figure) for the aforesaid electromagnetic unit 10. Although actuated in the clockwise direction by a helical torsion spring 108, it is in contact with and stopped by a stop pin 109 which is planted also on the aforesaid fitting base plate.

Numeral 110 denotes a gear fitted to the aforesaid supporting member 107 so that the rotational center thereof is in accord with that of this member, and it engages with another gear 111 fitted axially to said fitting base plate as well.

Numeral 112 denotes a lever A fitted integrally to said gear 111 so that the rotational center thereof is in accord with that of this gear, and the left end side thereof is formed to have a circular-arc section.

Numeral 113 denotes a lever which is fitted axially to a protrusion 104a provided on the inner peripheral surface of the aforesaid movable lens unit 102. Although actuated counterclockwise by a helical torsion spring 114, this lever 113 is stopped at a position shown in the figure, since said helical torsion spring 114 is so provided as to have a considerably smaller acutuating force than the aforesaid helical torsion spring 108 and since a lever B 113b provided on an axis seat 113a formed integrally with the lever 113 contacts perpendicularly with the aforesaid lever A 112. The right end side of said lever B 113b is formed to have a circular-arc section like the lever A 112, so that an operation is transmitted smoothly and exactly even when a strong pressure is applied thereon.

Thus, these members and the aforesaid conversion lens 106 form a rear lens unit in the photographing optical system in relation to the previously-described front lens unit.

The photographing optical system forms a long focus system in the above-described state. When the aforesaid movable lens unit 102 is sunk into the aforesaid base part 101 of the lens-barrel fixed to the front of the main body of the camera, on the other hand, a contact piece 113c fitted to the fore end of the aforesaid lever 113 is pressed by a backing plate 121 located on the base part 101 of the lens-barrel fixed to the front of the main body of the camera, and thereby said lever 113 is rotated counterclockwise, being accompanied by the rotations of the gears 111 and 110 through the intermediary of the aforesaid lever B 113b and lever A 112. By these rotations of gears, the aforesaid conversion lens 106 is rotated counterclockwise to a large degree, thus being transferred from the optical path 103b of the aforesaid photographing main lens 50 and moved back into a space 102a inside the movable lens unit 102.

Thus, the photographing optical system is switched over to a short focus system. On the occasion of this switching-over of a focal distance, the rear lens unit is to occupy a gap, i.e. a sectional space, on the majority of the circumference thereof in the rear of the electromagnetic unit 10, while a dead space 102b remains unemployed on the circumference on the opposite side of said circumference. In the present invention, therefore, a proposal is made that a motor 60 for driving the lens, which is a power source of the focusing system, be disposed in said dead space 102b.

As shown in FIGS. 6 and 7, said dead space 102b constitutes actually a part of a substantially circular space surrounding the optical path 103b included by the photographing main lens 50, between the aforesaid electromagnetic unit 10 and the light-intercepting frame 105, and it is a space formed on the same section with the aforesaid rear lens unit.

Said dead space 102b is positioned at close range to the focusing apparatus with the electromagnetic unit 10 interposed between, and therefore the disposition of the motor 60 in the dead space 102b facilitates the connections of these devices. Moreover, since the motor is moved integrally with the focusing system as the movable lens unit 102, a structure of connection is simplified, which is very advantageous for incorporation of the automatic focusing apparatus.

Now, when a distance-measuring device detects a distance to an object in linkage to an action for operating the release of the camera, an operation for focusing the photographing lens 50 is started. This operation will be described with reference to FIGS. 2 (a) and 2 (b) and FIG. 3.

In the first stage, the stepped cam 31 of the lens-positioning member 30 and the groove cam 42 of the lens-driving member 40 are parallel substantially to each other while they are curved with a slight space between them, as shown in FIG. 2 (a). On the occasion, the guide pin 51 of the photographing lens 50 is positioned on the lower end side of the groove cam 42 in the figure, in other words, on the fore end side of the optical axis.

Next, when the second movable coil member 12 is energized with a positive current, a torque of movement in the clockwise direction is given to the regulation pin 11, and if the stop pawl 24 happens to have engaged with the pawl 36 of the lens-positioning member 30, it is disengaged therefrom. In other words, first the stop pawl 24 is unlocked.

Specifically, when regulation pin 11 is moved clockwise as seen in FIG. 1, it is brought into engagement with pawl 24. Due to the presence of the indentation (unnumbered) on the inner surface of pawl 24, it is caused to rotate about its rotary shaft in the counterclockwise direction, thereby moving pawl 24 out of engagement with pawl teeth 36 of lens-positioning member 30.

Then, the energization of the motor 60 is started a little behind the operation of the regulation pin 11. Thereby the motor starts to rotate normally, making the lens-driving member 40 and the lens-positioning member 30 rotate simultaneously in the clockwise direction (in the direction of an arrow A of FIGS. 2 (a) and 2 (b)).

The photographing lens 50 moves backward linearly with the above-stated motions. Simultaneously, the contact piece 35 starts to slide on the printed plate 22, and thereby pulses in the number corresponding to the amount of rotation of the lens-positioning member 30, i.e. the amount of movement of photographing lens 50 in the direction of the optical axis, are delivered from the printed plate 22.

When the number of these pulses accords with the number of pulses set beforehand in accordance with the result of measurement of the distance, the energization of the motor 60 is discontinued.

Next, the second movable coil member 12 is energized with a negative current a little behind the above stoppage of the energization of the motor 60. Thereby the regulation pin 11 is rotated counterclockwise, the stop pawl 24 is made to engage with the pawl teeth 36, and the rotation of the lens-positioning member 30 is locked.

The relative positional relationship between the printed plate 22 and the contact piece 35 provided on the positioning member 30 is determined in consideration of an amount of overrun which is caused by the rotation of the positioning member 30 until it is locked after the number of pulses delivered from the printed plate 22 turns in accord with the number of pulses set beforehand in accordance with the result of measurement of the distance.

As the result of the above-described operation, the guide pin 51 is guided to a position in front of and apart from some selected step (a step corresponding to the result of measurement of the distance) of the stepped cam 31 of the lens-positioning member 30. Mark 51a in FIG. 2 (b) denotes said position of the guide pin 51. Thereby the operation of selecting a specified step of the stepped cam 31 corresponding to said result of measurement is ended.

Next, the motor 60 starts normal rotation again a little behind the locking of the lens-positioning member 30, and thereby the lens-driving member 40 is rotated further in the clockwise direction. On the occasion, the presser spring 33 fitted to the lens-positioning member 30 disengages from the cut 48 of the lens-driving member 40, and thus the lens-driving member 40 rotates solely.

By this second normal rotation of the lens-driving member 40, the guide pin 51 of the photographing lens 50 held at a position spaced from the aforesaid stepped cam 31 is urged against the step in front of it, as shown by mark 51b of FIG. 2 (b), and consequently the photographing lens 50 is set at a position on the optical axis corresponding to the result of measurement of the distance. Thereafter, the normal rotation of the motor 60 stops after a prescribed time passes.

The photographing lens 50 is focused to an object in this way, and successively exposure is executed by the operation of a first movable coil member not shown in the figure, thus a shutter operation being completed.

When the shutter operation is completed, a positive current flows again through the second movable coil member 12, the regulation pin 11 is moved thereby in the clockwise direction, the stop pawl 24 disengages from the pawl teeth 36, and thus locking is canceled.

Then, the motor 60 starts to rotate reversely, and first the lens-driving member 40 is rotated thereby counterclockwise to move the photographing lens 50 forward linearly. When the cut 48 of the member 40 reaches the position at which it engages with the presser spring 33 of the lens-positioning member 30, the lens-driving member 40 turns to be integrated with the lens-positioning member 30 and is rotated further counterclockwise to return to the initial state, and thereafter the motor 60 stops.

The distance of the movement of the guide pin 51 to the front of a prescribed step of the stepped cam 31 is a length corresponding to a distance to an object. When the distance to the object is long, for instance, many pulses need to be delivered, and thus the distance of the movement of the guide pin 51 turns long as well. When the distance to the object is short, to the contrary, few pulses are to be delivered, and thus the distance of the movement of the guide pin 51 becomes short.

Accordingly, a time required for selecting a prescribed step of the stepped cam varies according to the result of measurement of a distance, and this is inevitable.

In the present invention, such a design is made in this connection that a time for pushing the guide pin 51 against a selected step subsequently to the operation of selecting the step is varied reversely to the above, according to the aforesaid result of measurement of the distance. In the case when the pulses delivered from the printed plate 22 are as few as five, for instance, as shown in FIG. 3, a time for selection turns to be Ta. If a time for pushing is Tb on the occasion, the time for selection turns to be Ta' ($>$Ta) when the pulses are eight, as shown in FIG. 4. Therefore the time for pushing is made to be Tb' ($<$Tb) so as to make "Ta+Tb $\approx$ Ta'+Tb'", and thus the time required for focusing operation can be made free from the effect of the result of measurement of a distance.

In this way, the time for pushing is made to be short when the time required for the selecting operation is long, and consequently the time required for the focusing operation is so shortened on the whole as to prevent the occurrence of an unintentional movement of the hands in photographing.

In a camera manufactured on an experimental basis by the present inventor, the result of measurement of a distance is divided into thirteen stages, and the number of steps of the stepped cam is made to be thirteen. Moreover, in the case when the number of pulses obtained from the result of measurement of the distance is within a range of 1 to 6, the time for pushing the guide pin 51 is set to be 70 ms, and when said number of pulses is within a range of 7 to 13, said time for pushing is set to be 50 ms. This setting of the time for pushing only in two kinds is for convenience sake in manufacture, etc., and the time for pushing can be set, of course, for each number of pulses.

In the above-described embodiment, a selecting mechanism for selecting a step of a stepped cam in accordance with the result of measurement of a distance and a pushing mechanism for pushing the photographing lens against the selected step of the stepped cam are constructed commonly of the lens guide 20, the lens-positioning member 30, the lens-driving member 40, the guide pins 51 of the photographing lens 50 and the presser spring 33. On the occasion of the operation of selecting a step, the lens-positioning member 30 and the lens-driving member 40 are moved integrally, and on the occasion of the operation of pushing the lens against the step selected, the lens-positioning member 30 is locked, while the lens-driving member 40 alone is moved. However, the construction is not limited to the above, and the selecting mechanism and the pushing mechanism can be constructed quite independently of each other.

Even when the lens-positioning member 30 rotates following after the reverse rotation of the motor 60 due to frinction or the like before said integration is brought about by the engagement of the presser spring 33 with the cut 48, it engages with lens-driving member 40 without fail in the course of the return of the latter and gets to the above-described state and stops, since the entire rotational angle of the member 30 is limited.

As is apparent from the above description, the photographing lens 50 is always made to take a position very close to the aforesaid stepped cam 31 by the lens-driving member 40 concurrently with the operation of detection and setting of the stepped cam 31 made by the rotation of the lens-positioning member 30, in the focusing apparatus of the present invention, and therefore the photographing lens 50 can be set at a focal position by a small intermittent rotation of said lens-driving member 40 made after said lens-positioning member 30 gets to the position for detection and stops.

In the focusing apparatus of the present invention, accordingly, two operating members of the lens-driving member 40 and the lens-positioning member 30 are employed as members for operating the photographing lens 50 for focusing, and thus it is characterized in that it has a function of high precision and durability while requiring only a very short time for the focusing operation.

The aforesaid stop pawl 24 employed in such an automatic focusing apparatus is provided further with the following function in the present invention.

Figure 8:
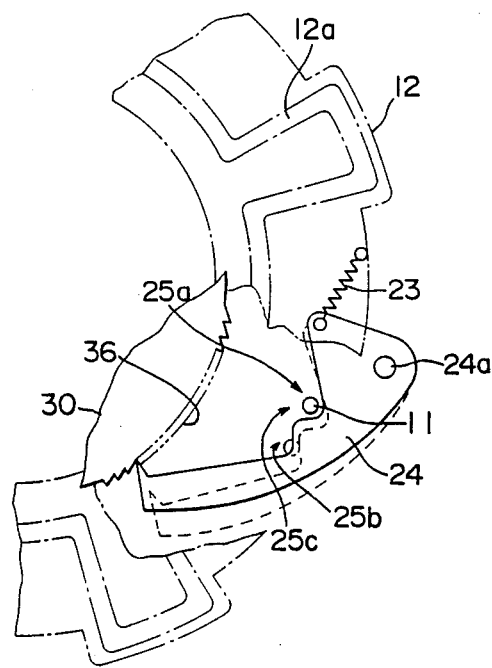
FIG. 8 is an analytical perspective view of the automatic focusing apparatus.

As is shown in FIG. 8, the contour on the optical axis side of said stop pawl 24 is formed to be a specific curve by a first indented portion 25a and a second indented portion 25b provided in this sequence from a rotary support shaft 24a thereof onward and by a projecting portion 25c provided in the middle of these indented portions so as to connect them together.

When the second movable coil member 12 of the electromagnetic unit 10 is at a position after it is rotated counterclockwise by the energization thereof, the regulation pin 11 is positioned in the area of said first indented portion 25a of the stop pawl 24, and thereby the stop pawl 24 is engaged with the pawl teeth 36 as indicated by a solid line, so that the lens-positioning member 30 is stopped. Even if the energization of said second movable coil member 12 is discontinued in this state, this member is held stably in an indirect manner at the position to which it is rotated, since said regulation pin 11 is prevented from moving freely by the presence of the first indented portion 25a and the tensile force of the helical extension spring 23.

When the aforesaid second movable coil member 12 is energized in the reverse direction and thereby rotated clockwise, the aforesaid regulation pin 11 gets over the projecting portion 25c into the area of the second indented portion 25b, operating to rotate the stop pawl 24 counterclockwise and disengage same from the aforesaid pawl teeth 36, as indicated by a broken line. Even if the energization of the second movable coil member 12 is discontinued under the condition, this member is held stably at the position to which it is rotated, in the same way as described above, since said regulation pin 11 is pressed in the direction in which it can not rotate, by the slanting surface of said projecting portion 25c and the tensile force of the aforesaid helical extension spring 23.

In the automatic focusing apparatus of the present invention, in this way, long-time energization of the electromagnetic unit 10 can be dispensed with by employing the bistable electromagnetic device composed of said stop pawl 24 and said movable coil member 12 combined together, as a means to control the lens-positioning member 30.

Figure 10:
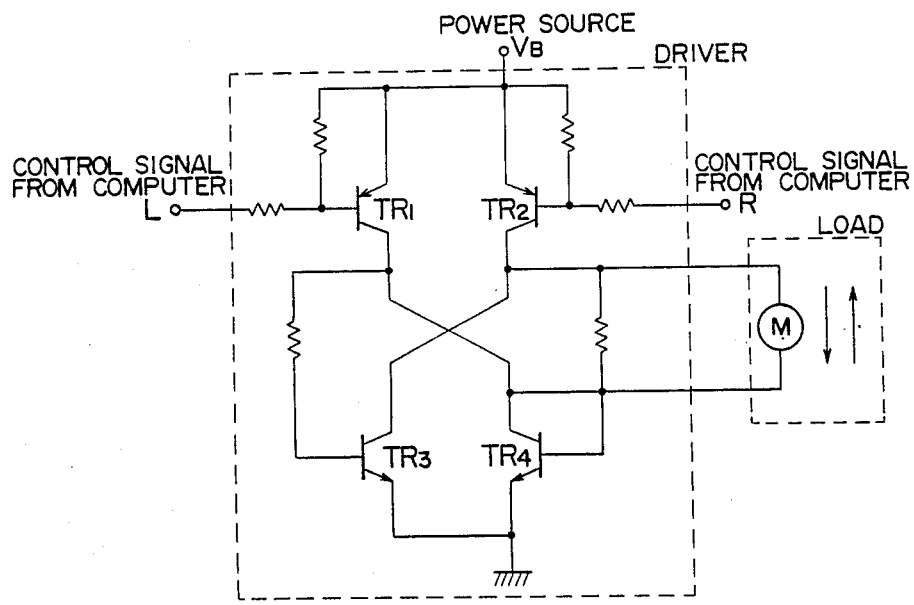
FIG. 10 is a diagram of a driving circuit of said apparatus.

FIG. 10 shows a driving circuit of a motor. Mark M denotes the motor 60 in FIG. 1. When a signal is applied from a control circuit to a terminal L, transistors $TR_1$ and $TR_3$ are turned to ON state and thereby the motor M is made to rotate normally. When a signal is applied to a terminal R, transistors $TR_2$ and $TR_4$ are turned to ON state, and thereby the motor M is made to rotate reversely.

Figure 9:
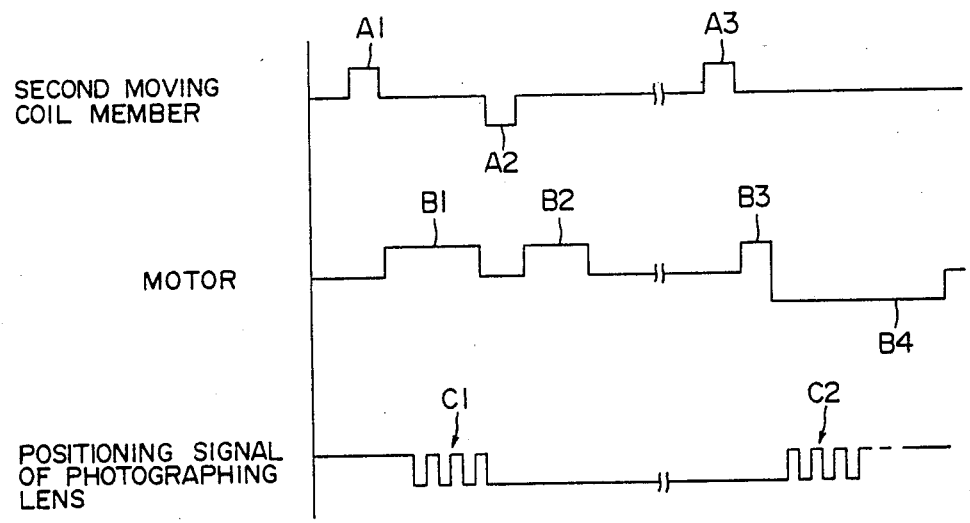
FIG. 9 shows an operational sequence of a focusing apparatus according to the present invention.

Next, the operations and functions of these circuits will be described with reference to FIG. 9.

In linkage to an action of operating a release of the camera, a distance-measuring device detects a distance to an object, and an information on it is inputted to the aforesaid control device.

Next, on starting the focusing operation, the following operation is conducted so as to confirm that the lens-positioning member 30 is in the controllable state: the regulation pin 11 is rotated clockwise beforehand by applying electrification A1 in the normal direction to the aforesaid second movable coil member 12, and thereby the aforesaid stop pawl 24 is rotated counterclockwise to be disengaged from the pawl teeth 36 of the lens-positioning member 30.

A little behind the rotation of said regulation pin 11, the motor 60 starts to rotate counterclockwise by energization B1 thereof in the normal direction, rotating the lens-driving member 40 and the lens-positioning member 30 integrally in the clockwise direction through the intermediary of the pinion 61.

By this operation, the photographing lens 50 is moved backward linearly, and simultaneously the sliding contact of the contact piece 35 with the printed plate 22 is started, so that the position of said photographing lens is applied by a pulse signal C1 to the control device.

In the control device, said signal is compared with a signal set beforehand in response to a distance information from the distance-measuring device, and when these signals coincide with each other, the energization of the motor 60 is discontinued temporarily, while energization A2 in the reverse direction is applied to the second movable coil member simultaneously.

As the result, the counterclockwise rotation of the regulation pin 11 makes the stop pawl 24 engage with and stop the rotation of the lens-positioning member 30, and thus the stepped cam 31 is stopped at a necessary position.

Then, the motor 60 starts rotation again by second normally-directional energization B2 thereof, rotating the lens-driving member 40 further in the clockwise direction. Thereby the engagement of the presser spring 33 with the cut 48 is canceled, and consequently the lens-driving member 40 alone is rotated in a single body.

By this successive rotation of the lens-driving member 40, the guide pin 51 of the photographing lens 50 held thus far at a position spaced from the stepped cam 31 as described previously is made to contact with a prescribed step of the stepped cam 31 by the cam groove 42, so as to set said photographing lens 50 at a position on the optical axis corresponding to the distance information from the distance-measuring device. Thereafter, the motor 60 stops a prescribed time later, thus the operation thereof, i.e. the operation made until the focusing, being ended.

When the focusing of the photographing lens 50 is completed in this way, the first movable coil member, which is not shown in the figure, is made to operate to execute exposure. When photographing is completed, a signal on completion is delivered, and third normal-directional energization A3 is applied thereby to the aforesaid second movable coil member 12. Thereby the stop pawl 24 is disengaged in the same way as in the above-described case, and thus the lens-positioning member 30 is released.

Next, the reverse rotation of the aforesaid motor 60 is started to execute the operation for returning the focusing system to its initial position. In the construction of the present invention, first pulse energization B3 in the normal direction is applied, energization B4 in the reverse direction is made in succession thereafter, and thereby a reaction torque generated by inertia is given to the motor 60 to surmount a frictional resistance generated between the cam groove 42 and the guide pin 51, so that the return of the lens-driving member 40 to its initial position by the reverse rotation can be ensured.

It is desirable that the effect of the aforesaid pulse energization B3 is increased even when this energization is repeated consecutively in several times and that it is determined in accordance with an angle of inclination of the cam groove 42 or the like.

Thus, the photographing lens 50 is moved forward linearly by the reverse rotation of the motor 60, while the lens-positioning member 30 is integrated with the lens-driving member 40 in the same process by another engagement of the presser spring 33 with the cut 48, and consequently these members return to the initial positions respectively.

A pulse signal C2 is generated by the contact piece 35 and the printed plate 22 on the occasion of the return of said lens-positioning member 20, and the reverse rotation of said motor 60 is designed to stop a little time after the completion of this signal, in view of bounding or the like which is to occur after the return of the lens-driving member 40 etc. to the initial positions.

Industrial Applicability

The present invention makes it possible to furnish the automatic focusing apparatus of a camera which enables the distribution of a load of a focusing operation matched with the rise torque characteristic of a motor and is effective also for making a lens-barrel compact.

Moreover, the present invention makes it possible to fix substantially the time required for the focusing operation, to shorten the time required for focusing as a whole even when a time required for selecting the stepped cam is long, and thus to prevent effectively the unintentional movement of the hands in photographing. In the case when a gap in the direction of the optical axis between the stepped cam and the groove cam is different between the short distance side and the long distance side as shown in FIGS. 2 (a) and 2 (b), the present invention is effective also for preventing the occurrence of an overcurrent in the motor after pushing is conducted.

Furthermore, the present invention makes it possible to furnish the automatic focusing apparatus in which the stop pawl engaged or disengaged to put the lens-positioning member in the stopped state or the movable state can be controlled by the normal or reverse pulse energization of the electromagnetic device.

In addition, the present invention enables the sure execution of the operation of the controlling member to drive the photographing lens in the focusing apparatus, and particularly of the operation to return same to the initial position, and thus it can furnish the focusing system of high reliability.

Besides, the present invention enables the realization of a bifocal camera of an automatic focusing type in which a power transmission mechanism for driving the focusing apparatus by a power of a motor is made simple and efficient and which is effective, in addition, for making the main body of the camera compact.

We claim:

1. An automatic focusing camera comprising:
   a distance measuring means for producing a distance information of an object;
   a photographic lens;
   lens guide means attached to the lens for moving the lens along an optical axis;
   a lens-driving means having a groove adapted to receive the lens guide means;
   a lens-positioning means arranged adjacent the lens-driving means, said lens-positioning means having a stepped cam for setting the position of stoppage of the lens moved by the lens-driving means; and
   means for controlling the rotation of the lens-driving means and the lens-positioning means in accordance with the distance information from the distance measuring means; wherein the lens-driving means and the lens positioning means are rotated relative to each other by the controlling means to focus the lens, whereby both the lens-driving means and the lens-positioning means are simultaneously rotated then only the lens-driving means is rotated to move the guide means onto the stepped cam of the lens-positioning means along the groove for focusing and thereafter the lens-driving means is stopped at a position based on the distance information.

2. The camera according to claim 1 further comprising a frictional means to combine the lens-driving means and the lens positioning means whereby the frictional means, give a releaseable rotation to the lens-driving means after the stopping of the lens-positioning means.

3. The camera according to claim 1 further comprising a stop means to stop the rotation of the lens-positioning means.

4. The camera according to claim 3 further comprising an electromagnetic means to drive the stop means.

5. The camera according to claim 4 wherein the electromagnetic means is a bistable electromagnetic device.

6. The camera according to claim 4 wherein the stop means comprises a cam having a first and second indented portions and regulation pin which is connected at one end to the electromagnetic means, whereby the pin, is contacted by at least one of the portions of the cam thereby to regulate the rotation of the lens-positioning means.

7. The camera according to claim 1 wherein the stepped cam has a plurality of steps corresponding to a plurality of focal positions.

8. The camera according to claim 1 further comprising a rear lens unit adapted to move change into or out of a photographic optical path to a focal distance of the camera.

9. An automatic focusing method which comprises obtaining:
   a distance information of an object;
   rotating simultaneously a lens-driving means and a lens-positioning means to move a photographic lens along an optical axis;
   stopping the lens-positioning means to set a stopped position of a lens in accordance with the distance information; and rotating the lens-driving means to move the lens to a focal position after the stop of the lens-positioning means.

10. The automatic focusing method according to claim 9 further comprising returning the lens-driving means and the lens-positioning means to their initial positions.

* * * * *